(12) United States Patent
Zeng et al.

(10) Patent No.: US 9,657,678 B2
(45) Date of Patent: May 23, 2017

(54) SYSTEMS AND METHODS FOR USING TRANSPORT TIME TO ESTIMATE ENGINE AFTERTREATMENT SYSTEM CHARACTERISTICS

(71) Applicant: General Electric Company, Schenectady, NY (US)

(72) Inventors: Pin Zeng, Oconomowoc, WI (US); Prashant Srinivasan, Bangalore (IN); Mark James Lemke, Sun Prairie, WI (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 14/680,934

(22) Filed: Apr. 7, 2015

(65) Prior Publication Data

US 2016/0298567 A1  Oct. 13, 2016

(51) Int. Cl.

| | |
|---|---|
| *F02D 41/26* | (2006.01) |
| *F02D 41/00* | (2006.01) |
| *F02D 41/02* | (2006.01) |
| *F02D 41/14* | (2006.01) |
| *F01N 11/00* | (2006.01) |
| *F01N 13/00* | (2010.01) |

(52) U.S. Cl.
CPC ............ *F02D 41/26* (2013.01); *F01N 11/007* (2013.01); *F01N 13/008* (2013.01); *F02D 41/0002* (2013.01); *F02D 41/0295* (2013.01); *F02D 41/14* (2013.01); *F02D 41/1441* (2013.01); *F02D 41/1481* (2013.01);
(Continued)

(58) Field of Classification Search
CPC ...... F02D 41/00; F02D 41/0002; F02D 41/26; F01N 11/00; F01N 11/007; F01N 2260/00; F01N 2560/00

USPC ......... 701/102–104, 108, 109, 114; 123/697, 123/703; 60/274, 276
See application file for complete search history.

(56) References Cited

U.S. PATENT DOCUMENTS

| | | | |
|---|---|---|---|
| 5,301,501 A | * | 4/1994 | Shimizu ................ F01N 11/007 60/274 |
| 5,737,916 A | * | 4/1998 | Mitsutani .............. F01N 11/007 60/276 |

(Continued)

FOREIGN PATENT DOCUMENTS

JP   H0953494 A   2/1997

OTHER PUBLICATIONS

International Search Report and Written Opinion issued in connection with corresponding Application No. PCT/US2016/025987 on Jul. 14, 2016.

*Primary Examiner* — John Kwon
*Assistant Examiner* — Johnny H Hoang
(74) *Attorney, Agent, or Firm* — Fletcher Yoder, P.C.

(57) ABSTRACT

A system includes a controller that has a processor. The processor is configured to receive a first signal from a first sensor indicative of a first exhaust measurement, wherein the first sensor is disposed at a catalytic converter system inlet of a catalytic converter system. The processor is further configured to derive one or more of an estimated length, estimated volume, or estimated transport delay of an exhaust conduit based on the first signal, wherein a first end of the exhaust conduit is connected to an engine outlet of a engine, and a second end of the exhaust conduit is connected to the catalytic converter system inlet; and to apply the one or more of estimated length, estimated volume, or estimated transport delay of the exhaust conduit during control of the engine.

17 Claims, 5 Drawing Sheets

(52) U.S. Cl.
CPC ........ *F02D 41/263* (2013.01); *F01N 2340/00* (2013.01); *F01N 2340/02* (2013.01); *F01N 2560/021* (2013.01); *F01N 2560/022* (2013.01); *F01N 2560/025* (2013.01); *F01N 2560/026* (2013.01); *F01N 2560/06* (2013.01); *F01N 2560/14* (2013.01); *F01N 2900/0416* (2013.01); *F01N 2900/0601* (2013.01); *F02D 41/146* (2013.01); *F02D 41/1452* (2013.01); *F02D 41/1453* (2013.01); *F02D 41/1454* (2013.01); *F02D 2041/1431* (2013.01); *F02D 2041/1468* (2013.01); *F02D 2200/0814* (2013.01)

(56) References Cited

U.S. PATENT DOCUMENTS

| | | | |
|---|---|---|---|
| 5,743,086 A * | 4/1998 | Nagai | F01N 11/007 60/276 |
| 5,887,421 A * | 3/1999 | Mitsutani | F01N 11/007 60/274 |
| 5,901,552 A | 5/1999 | Schnaibel et al. | |
| 5,901,553 A * | 5/1999 | Cullen | F02D 41/1494 123/697 |
| 6,550,466 B1 | 4/2003 | Behr et al. | |
| 7,162,359 B2 * | 1/2007 | Yasui | F02D 41/1401 60/276 |
| 7,721,527 B2 * | 5/2010 | Bruck | F01N 3/281 422/177 |
| 2003/0084659 A1 | 5/2003 | Bruck et al. | |
| 2003/0187568 A1 * | 10/2003 | Yasui | G05D 23/2401 701/109 |
| 2006/0288983 A1 * | 12/2006 | Watanabe | F01L 1/022 123/406.45 |
| 2009/0248281 A1 * | 10/2009 | Iihoshi | F01N 11/007 701/109 |
| 2011/0073087 A1 | 3/2011 | Meyer et al. | |
| 2012/0031170 A1 * | 2/2012 | Matsumoto | F01N 11/007 73/30.01 |

\* cited by examiner

SYSTEMS AND METHODS FOR USING TRANSPORT TIME TO ESTIMATE ENGINE AFTERTREATMENT SYSTEM CHARACTERISTICS

BACKGROUND

The subject matter disclosed herein relates to aftertreatment systems for engine systems. Specifically, the subject matter described below relates to systems and methods for using transport time delay to estimate engine aftertreatment system characteristics.

Engine systems provide power for a variety of application, such as oil and gas processing systems, commercial and industrial buildings, and vehicles. Many engine systems include or are coupled to a control system that oversees the operation of the engine system. The control system may improve efficiency of the engine system, and provide other functionality. For example, the control system may improve the efficiency of the engine system by controlling the air-to-fuel ratio of the engine, which represents the amount of air provided to the engine relative to the amount of fuel provided to the engine. Depending on desired applications, the control system may try to keep the air-to-fuel ratio near stoichiometry, which is the ideal ratio at which all of the fuel is burned using all of the available oxygen. Other applications may keep the air-to-fuel ratio lean (i.e., excess air) or in a range between rich (i.e., excess fuel) and lean.

As will be appreciated, engine systems produce exhaust gases as a result of burning fuel; and the type of exhaust gases emitted may depend in part on the type and amount of fuel provided to the engine system. Many industries and jurisdictions (e.g., coal-burning plants, federal and state governments, etc.) may have regulations and restrictions specifying the types and amounts of exhaust gases that different engine systems are permitted to emit.

To comply with regulations and restrictions, engine systems may also include an aftertreatment system coupled to the engine, which may include a catalytic converter system. The catalytic converter system receives the exhaust gases from the engine system and substantially converts the exhaust gases into other types of gases permitted by regulations and restrictions, and then exhaust conduits release the resultant exhaust into the atmosphere. The performance of the aftertreatment system may impact the performance of the engine, and vice versa. It would be beneficial to improve the performance of the engine and aftertreatment systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller that has a processor. The processor is configured to receive a first signal from a first sensor indicative of a first exhaust measurement, wherein the first sensor is disposed at a catalytic converter system inlet of a catalytic converter system. The processor is further configured to derive one or more of an estimated length, estimated volume, or estimated transport delay of an exhaust conduit based on the first signal, wherein a first end of the exhaust conduit is connected to an engine outlet of a engine, and a second end of the exhaust conduit is connected to the catalytic converter system inlet; and to apply the one or more of estimated length, estimated volume, or estimated transport delay of the exhaust conduit during control of the engine.

In a second embodiment, a method includes receiving, via a processor, a first signal from a first sensor indicative of a first exhaust measurement, wherein the first sensor is disposed at a catalytic converter system inlet of a catalytic converter system. The method further includes deriving, via the processor, one or more of an estimated length, estimated volume, or estimated transport delay for an exhaust conduit based on the first signal, wherein a first end of the exhaust conduit is connected to an engine outlet of a engine and a second end of the exhaust conduit is connected to the catalytic converter system inlet; and applying, via the processor, the one or more of estimated length, estimated volume, or estimated transport delay during control of the engine.

In a third embodiment, a tangible, non-transitory computer-readable medium includes executable instructions. The instructions, when executed by a processor, are configured to cause the processor to receive a first signal from a first sensor indicative of a first exhaust measurement, wherein the first sensor is disposed at a catalytic converter system inlet of a catalytic converter system. The instructions are further configured to cause the processor to derive one or more of an estimated length, estimated volume, or estimated transport delay of an exhaust conduit based on the first signal, wherein a first end of the exhaust conduit is connected to an outlet of an engine, and a second end of the exhaust conduit is connected to the catalytic converter system inlet. The instructions are additionally configured to cause the processor to apply the one or more of estimated length, estimated volume, or estimated transport delay of the exhaust conduit during control of the engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to techniques suitable for estimating a length (and corresponding volume) of an exhaust conduit, and other aftertreatment system parameters, as described in more detail below. For example, an exhaust conduit fluidly coupling an engine system to an aftertreatment system (e.g., catalytic convertor system, oxidation catalyst, selective catalytic reduction [SCR] system, non-selective catalytic reduction [NSCR or three-way] system, or other aftertreatment system) may include a length, volume, and other parameters (e.g., the presence of any fouling, the presence of any leaks) unknown to an engine control system. Such parameters may be unknown because the aftertreatment system was installed or modified by an end-user. The length, volume, and other parameters may be derived, for example, by the control system based on certain sensor measurements described in more detail below. By incorporating the derived length, volume, other parameters, the techniques described herein may more optimally control the engine system as well as provide for enhanced aftertreatment of exhaust gases.

Figure 1:
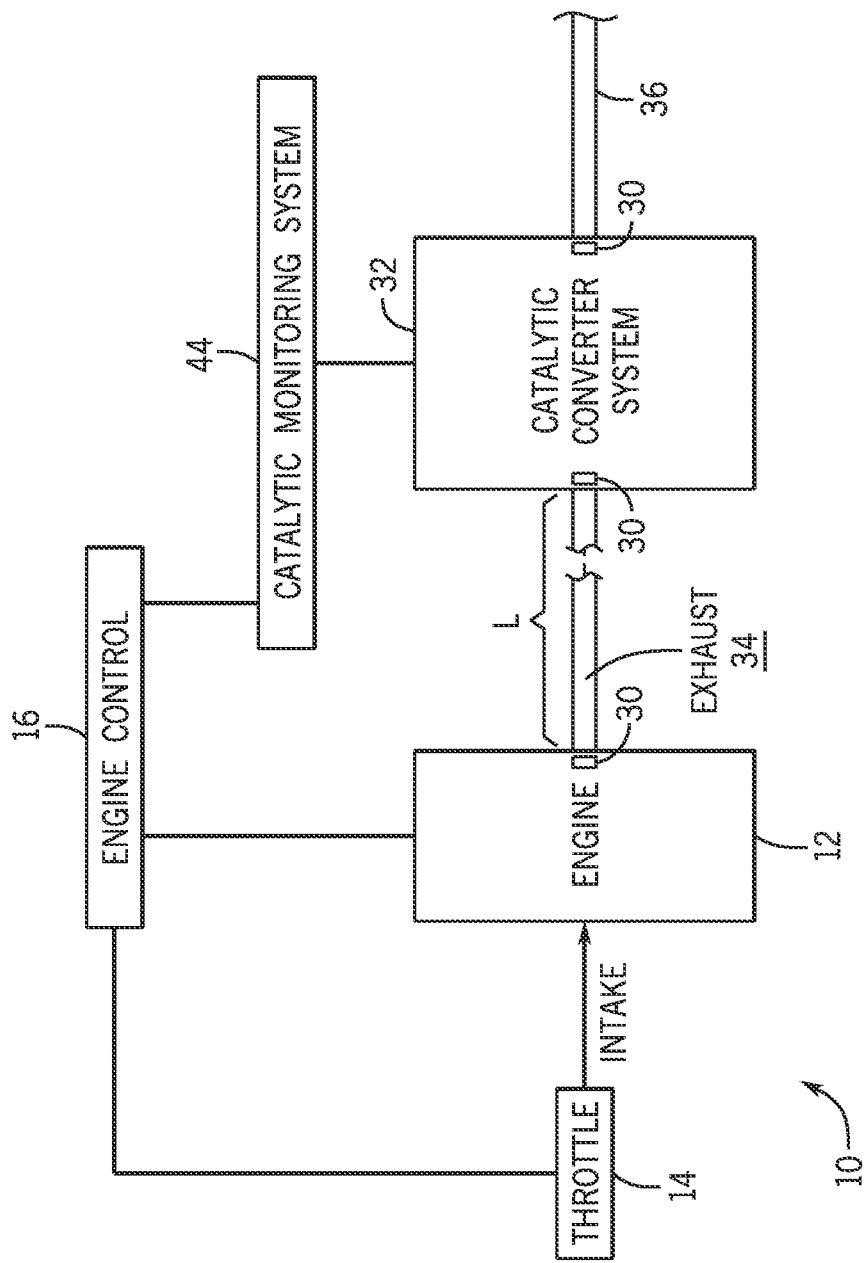
FIG. 1 is a block diagram of a engine system, in accordance with an embodiment of the present approach.

Turning now to FIG. 1, an engine system 10 is depicted, suitable for combusting fuel to produce power for a variety of applications, such as power generation systems, oil and gas systems, commercial and industrial buildings, vehicles, landfills, and wastewater treatment. The engine 10 system includes an engine 12, such as a Jenbacher™ and/or Waukesha™ gas engine available from the General Electric Company of Schenectady, N.Y. The engine system 10 may also include throttle(s) 14 coupled to the engine 12. Each throttle 14 may be a valve whose position controls the amount of oxidant (e.g., air), and in some cases fuel, provided to the engine 12. As such, the position of the throttle 14 partly determines an air-to-fuel ratio (AFR) of the engine 12. The AFR represents the ratio between an amount of oxygen available to combust an amount of fuel provided to the engine 12.

The engine system 10 further includes an engine control system 16 (e.g., engine control unit [ECU] or engine control module [ECM]), which may control the operation of the engine system 10, which is described in further detail below. To that end, the engine system 10 also includes sensors and actuators that may be used by the engine control system 16 to perform various tasks. For example, as shown in FIG. 1, the engine system 10 may include oxygen sensors 30 that are disposed at different locations in the engine system 10 and provide signals correlative to oxygen measurements for that particular location.

In one embodiment, two sensors 30 are used, with a first sensor 30 disposed at an outlet of the engine system 12, and a second sensor 30 disposed at an inlet of the catalytic converter system 32, as shown. In another embodiment, in addition to the two sensors 30 disposed as shown, a third sensor 30 may be disposed at an outlet to the catalytic converter system 32. In yet another embodiment, only one sensor 30 may be used, and this sensor 30 may be disposed in the inlet to the catalytic converter system 32. In yet other embodiments, more than three sensors 30 may be used and disposed, for example, in pairs, triples, and so on, to provide for enhanced measurements and added reliability.

It is also to be understood that while the sensors 30 may be preferably sensors suitable for measuring oxygen concentrations, such as lambda sensors, other oxygen sensors may be used, such as three-wire oxygen sensors, which may measure a difference between an amount of oxygen in an exhaust stream and an amount of oxygen in air. Likewise, while the sensors 30 may be preferably measure oxygen, other sensors 30 may additionally or alternatively measure nitrogen oxides (NOx), carbon monoxide, carbon dioxide, ammonia, and the like. Indeed, the sensors 30 may, in some embodiments, not be oxygen sensors but instead measure NOx, carbon monoxide, carbon dioxide, and/or ammonia.

The engine 12 may emit certain types and amounts of exhaust gases based on the type of fuel used. Certain industries and jurisdictions (e.g., the oil and gas industry, coal-burning plants, federal and state governments, etc.) may have restrictions and regulations that specify the types and amounts of exhaust gases that engines are permitted to emit.

To comply with these restrictions and regulations, the engine system 10 includes an exhaust conduit 34 coupled to the catalytic converter system 32. The catalytic converter system 32 receives the exhaust gases from the engine 12 and captures the exhaust gas and/or converts the exhaust gases into other types of emissions permitted by restrictions and regulations. For example, the catalytic converter system 30 depicted in FIG. 1 may performs three conversions: 1.) converting nitrogen oxides to nitrogen and oxygen, 2.) converting carbon monoxide to carbon dioxide, and 3.) converting unburned hydrocarbons to carbon dioxide and water. That is, the catalytic converter system 32 depicted in FIG. 1 is a three-way catalyst. Other embodiments may use other types of catalytic converters, and may additionally or alternatively use aftertreatment devices such as SCR catalysts or oxidation catalysts. The converted gases may then exit the catalytic converter system 32 via an output conduit 36, which may lead to another component of the engine system 10 (e.g., another catalytic converter 32, a heat recovery system) or to a vent.

To oversee the catalytic converter system 32, the engine system 10 includes a catalyst monitoring system 44, as shown in FIG. 1 and described in further detail below. The catalyst monitoring system 44 may be part of the engine control system 16 or may be a separate system that communicates with the engine control system 16. The catalyst monitoring system 44 may be communicatively coupled to the sensors 30, and then may derive a length and volume for the exhaust conduit 34.

Accordingly, a user of the engine system 10 may purchase the engine 12 and/or catalytic converter system 32 and may then custom fit the exhaust 34 to a desired length L, diameter, orientation, conduit 34 wall thickness/insulation or circuit (number of bends or geometry). The catalyst monitoring system 44 may, during operations, derive the length L, volume, and/or other parameters, and adjust operations of the engine system 10 accordingly. By applying the derived length L (and/or corresponding volume), the engine system 10 may be operated more efficiently, for example, to provide for rich and or lean burn, as desired.

Figure 2:
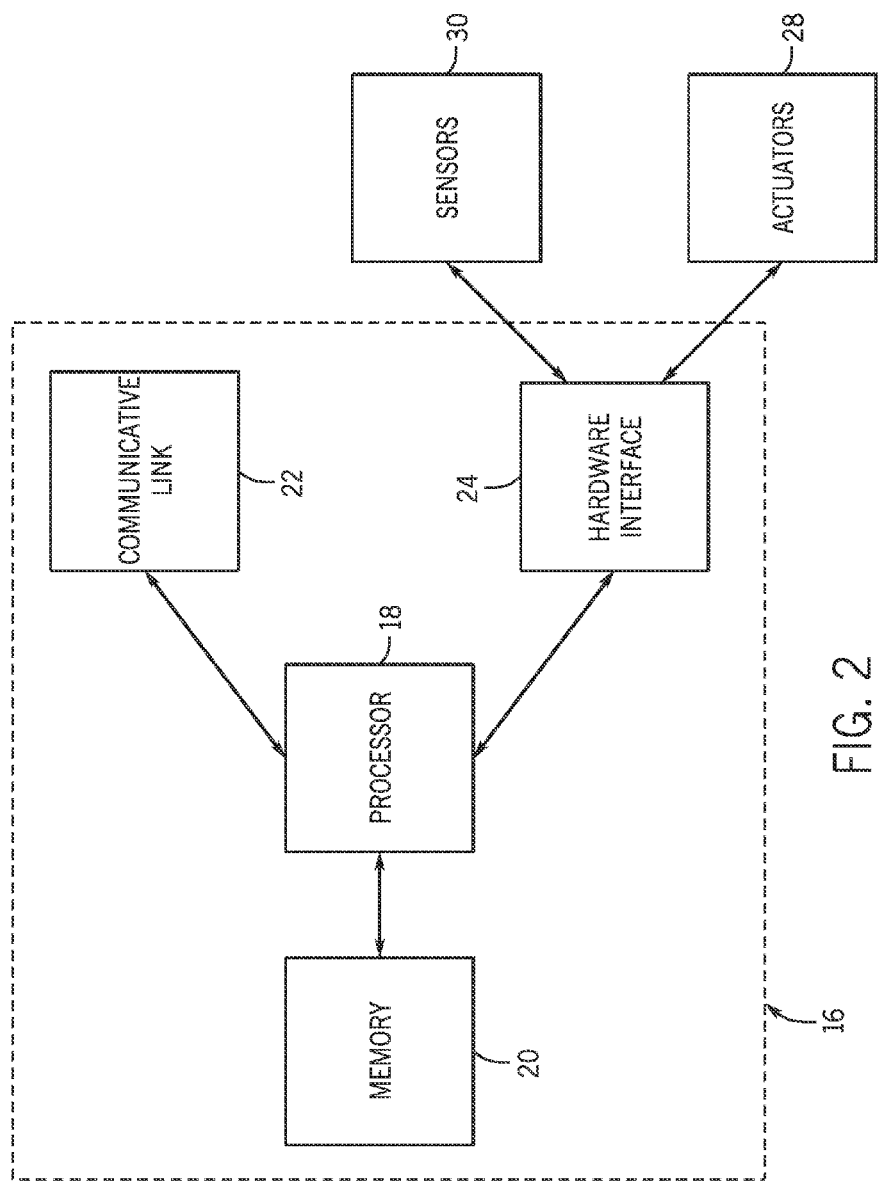
FIG. 2 is a block diagram of an engine control unit for the engine system of FIG. 1, in accordance with an embodiment of the present approach.

Turning now to FIG. 2, the engine control system 16 includes a processor 18; a memory 20, a communicative link 22 to other systems, components, and devices; and a hardware interface 24 suitable for interfacing with the sensors 30 and actuators 28, as illustrated in FIG. 2. In certain embodiments, the engine control system 16 may be an electronic control unit (ECU) or electronic control module (ECM) disposed, for example, in the engine 12. The processor 18 may include, for example, general-purpose single- or multi-chip processors. In addition, the processor 18 may be any conventional special-purpose processor, such as an application-specific processor or circuitry. The processor 18 and/or other data processing circuitry may be operably coupled to the memory 20 to execute instructions for running the engine control system 16. These instructions may be encoded in programs that are stored in the memory 20. The memory 20 may be an example of a tangible, non-transitory computer-readable medium, and may be accessed and used to execute instructions via the processor 18.

The memory 20 may be a mass storage device (e.g., hard drive), a FLASH memory device, a removable memory, or any other non-transitory computer-readable medium. Additionally or alternatively, the instructions may be stored in an additional suitable article of manufacture that includes at least one tangible, non-transitory computer-readable medium that at least collectively stores these instructions or routines in a manner similar to the memory 20 as described above. The communicative link 22 may be a wired link (e.g., a wired communication infrastructure or a local area network employing a controller area network (CAN), Ethernet) and/or wireless link (e.g., a cellular network or an 802.11x Wi-Fi network) between the engine control system 16 and other systems, components, and devices.

The sensors 30 may provide various signals to the engine control system 16. For example, as mentioned above, the sensors 30 may include oxygen sensors disposed at different locations in the engine system 10 and configured to provide signals correlative to oxygen measurements for that particular location. The actuators 28 may include valves, pumps, positioners, inlet guide vanes, switches, and the like, useful in performing control actions. For instance, the throttle 14 is a specific type of actuator 28.

Based on signals received from the sensors 30, the engine control system 16 may determine the length L and volume of the exhaust conduit 34, and may additionally determine other parameters. For example, a transport time T for an exhaust stream to traverse between the first sensor 30 disposed in the engine outlet and the second sensor 30 disposed in the catalytic converter system inlet may be derived. Other derivations may be possible, such as temperatures, pressures, mass flow rates, volume flow rates, NOx measurements, carbon monoxide measurements, carbon dioxide measurements, ammonia measurements, and the like. Transport time T may also be derived by measuring the time from a change of engine operating conditions with a predictable effect on a sensor until such effect is sensed by the sensor 30 disposed in the catalytic converter system inlet. For example, such change in engine operating conditions may be a change in AFR from rich to lean operation or vice versa. Any controllable change in engine operation that results in a sensible effect may be used.

By using derivations based on signals from sensors 30 (e.g., length L, volume V, transport time T, as temperatures, pressures, mass flow rates, NOx measurements, carbon monoxide measurements, carbon dioxide measurements, and/or ammonia measurements), the engine control system 16 may adjust one or more control aspects of the engine system 10 accordingly, for example by using an actuator 28. For instance, the engine control system 16 may endeavor to improve the efficiency of the engine 12 by controlling the AFR of the engine 12. In particular, the engine control system 16 may attempt to keep the AFR of the engine 12 at a desired ratio, such as near stoichiometry. As mentioned earlier, stoichiometry describes the ideal AFR ratio at which all of the provided fuel is burned using all of the available oxygen. In other embodiments, the engine control system 16 may attempt to keep the AFR of the engine 12 within a narrow band of acceptable values, including values where the AFR includes rich (i.e., excess fuel) burns or lean (i.e., excess air) burns, depending on desired engine 12 applications. In still other embodiments, the engine control system 16 may attempt to alternately dither the AFR between a rich and lean operating point. For example, a control gain or process gain may be adjusted or calibrated based on the derivations using sensor 30 signals, thus more efficiently and accurately providing for control of the engine system 10. The adjusted or calibrated control gain or process gain may allow a dithering engine control system 16 to maintain the engine system 10 in a narrow range of rich and lean operating points. Similarly, an engine control system 16 that varies another engine operating parameter in order to maintain the engine system 10 in any other operating range may maintain the engine system 10 in a more accurate state.

Figure 3:
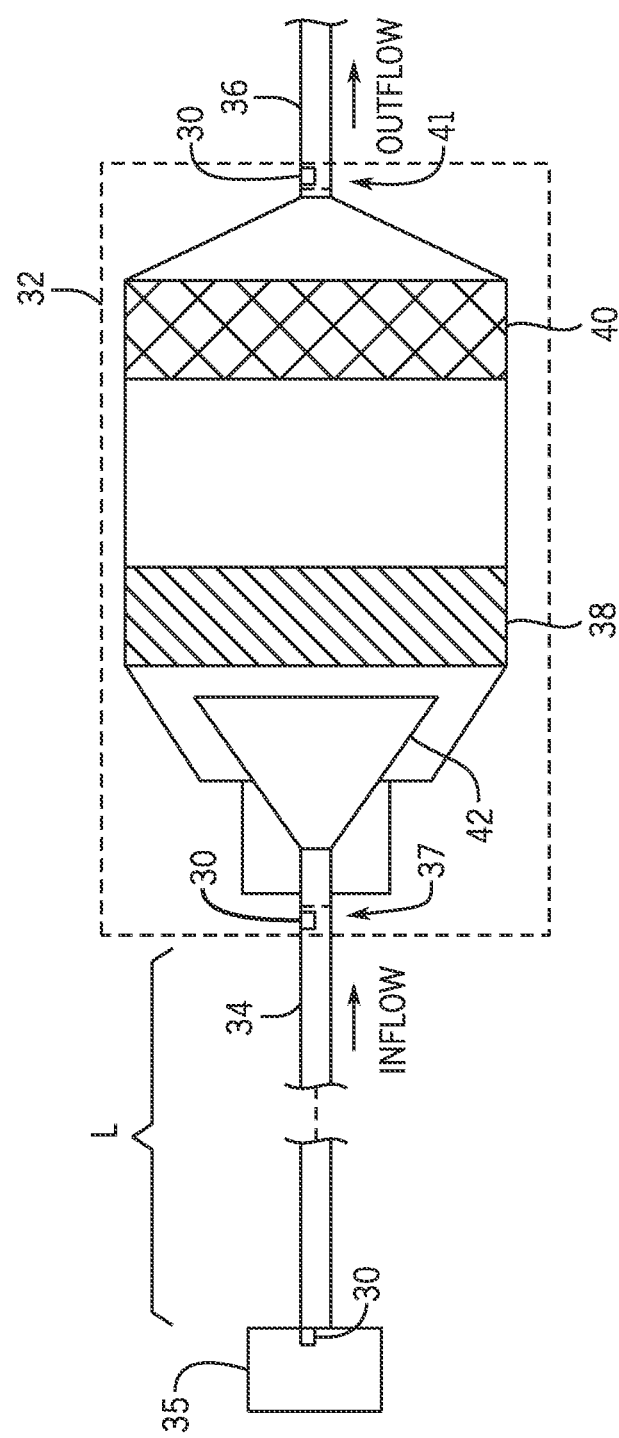
FIG. 3 is a cross-sectional of a catalytic converter system included in the engine system of FIG. 1, in accordance with an embodiment of the present approach.

Turning now to FIG. 3, an example of the catalytic converter system 32 is depicted. Also shown in an embodiment of the exhaust conduit 34 fluidly coupled to an outlet 35 of the engine and an inlet 37 of the catalytic converter system 32. It is to be understood that the inlet 37 may be positioned immediately downstream of a variety of engine 12 components, such as a turbocharger. The catalytic converter system 32 may include two catalytic structures, a reduction catalyst 38 and an oxidation catalyst 40. The catalytic structures may be ceramic or metallic structures coated with a metal catalyst, such as platinum, rhodium, and palladium.

As depicted in FIG. 3, the exhaust gases exiting the engine outlet 35 may first encounter the first sensor 30. The sensor 30 may then take a first set of measurements (oxygen, NOx, carbon monoxide, carbon dioxide, ammonia, temperature, pressure, and/or flow rate measurements) and transmit the first set of measurements to the engine control system 16, for example via electrical signals. The exhaust gases may then traverse the exhaust conduit 34. The exhaust conduit 34 may include the length L and volume V, which may be unknown to the engine control system 16, for example, because the installation of the catalytic converter system 32 may have resulted in a custom length and volume (e.g., length L and volume V) as desired by the entity operating the engine system 10.

The exhaust gases, after traversing the exhaust conduit 34, may then encounter the second sensor 30 disposed in the inlet 37 of the catalytic converter system 32. The second sensor 30 may then take a second set of measurements (oxygen, NOx, carbon monoxide, carbon dioxide, ammonia, temperature, pressure, and/or flow rate measurements) and transmit the second set of measurements to the engine control system 16, for example via electrical signals.

After the inlet 37, the exhaust gases may encounter the reduction catalyst 38. The reduction catalyst 38 may be coated with platinum and rhodium, and reduces the nitrogen oxides in the exhaust gases to nitrogen and oxygen. Next, the gases encounter the oxidation catalyst 40, which may be coated with palladium and rhodium. The oxidation catalyst 38 oxidizes the unburned hydrocarbons in the exhaust gases to carbon dioxide and water, and the carbon monoxide in the exhaust gases to carbon dioxide. The resultant gases may then encounter the third sensor 30 disposed at an outlet 41 of the catalytic converter system 32. The third sensor 30 may then take a third set of measurements (oxygen, NOx, carbon monoxide, carbon dioxide, ammonia, temperature, pressure, and/or flow rate measurements) and transmit the third set of measurements to the engine control system 16, for example via electrical signals. Finally, the converted gases exit the catalytic converter system 32 via the output conduit 36.

It is to be noted that several embodiments are envisioned for the placement of the sensors 30. In a preferred embodiment, the first and the second sensors 30 are used. In a second embodiment, only the second sensor 30 is used. In a third embodiment, the first, second, and third sensors are used. In a fourth embodiment, the second and third sensors 30 are used.

In certain embodiments, the catalytic converter system 32 may include a diffuser 42 positioned between the exhaust shaft 34 and the reduction catalyst 38. The diffuser 42 scatters the exhaust gases evenly across the width of the catalytic structures in the catalytic converter system 32. As a result, a larger amount of the exhaust gases may come into contact with the front end of the catalytic structures, allowing them to convert a large amount of the exhaust gases within a shorter distance. Further, scattering the exhaust gases using the diffuser 34 may also reduce the likelihood that different areas of the catalytic structures age at varying rates due to different concentration of the exhaust gases in particular areas.

Figure 4:
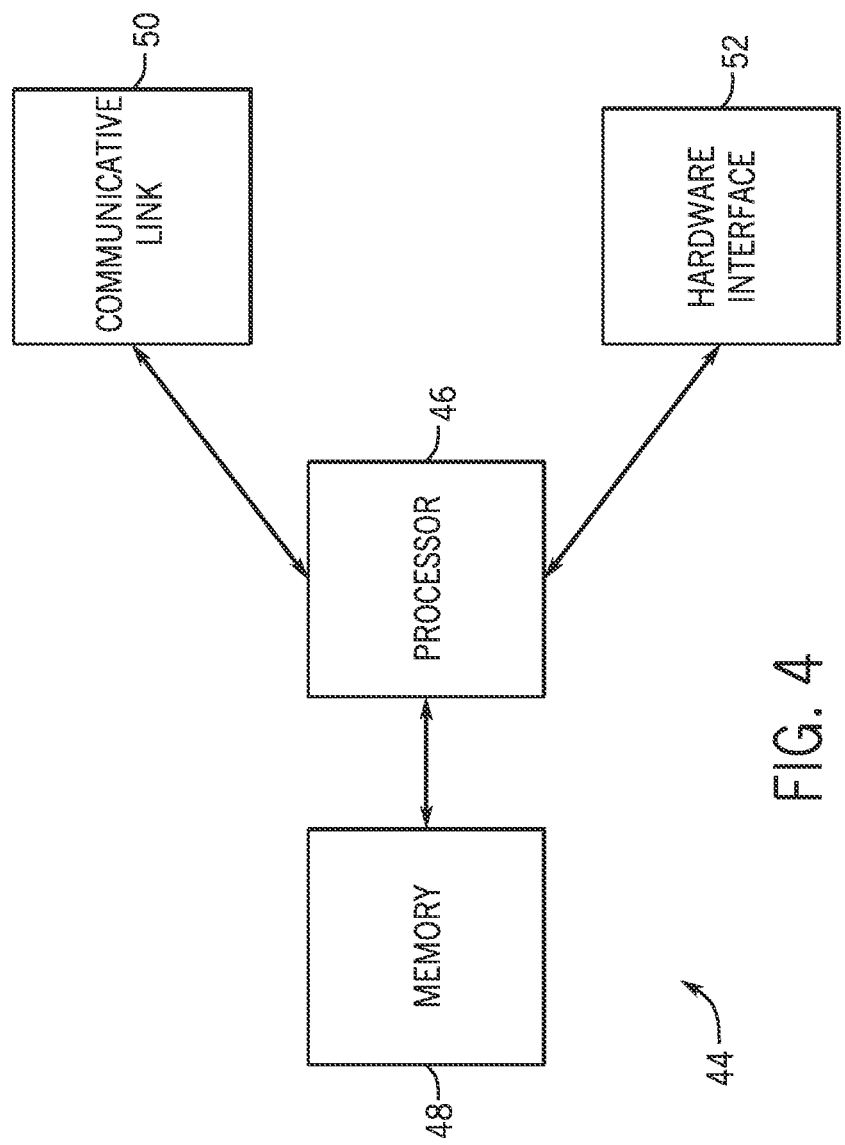
FIG. 4 is a block diagram of a catalyst monitoring system included in the engine system of FIG. 1, in accordance with an embodiment of the present approach.

As mentioned above, the engine control system 16 may control the AFR of the engine 12 so as to improve the efficiency of the engine 12. To do so, the engine control system 16 may monitor a number of factors, such as the sets of signals transmitted from the sensors 30, in order to determine any adjustments to the AFR of the engine 12. In one embodiment, the engine control system 16 may include or work in conjunction with the catalyst monitoring system 44, and the sensor 30 signals may be processed by the catalyst monitoring system 44. That is, the engine control system 16 may control the AFR of the engine 12 based on feedback from the catalyst monitor system 44. As depicted in FIG. 4, the catalyst monitoring system 44 may include a processor 46, a memory 48, a communicative link 50, and a hardware interface 52. These components may include hardware components similar to the processor 18, the memory 20, the communicative link 22, and the hardware interface 24 of the engine control system 16.

In certain embodiments, the catalyst monitoring system 44 may be included as a component, e.g., software or hardware component of the engine control system 16. In other embodiments, the catalyst monitoring system 44 may be a standalone system, for example, to offload processing from the engine control system 16.

As mentioned above, the catalyst monitoring system 44 may monitor the sensors 30. In particular, the catalyst monitoring system 44 monitors the sensors 30 to derive the length L, the volume V, transport time T, as temperatures, pressures, mass flow rates, NOx measurements, carbon monoxide measurements, carbon dioxide measurements, and/or ammonia measurements. Based on these derivation, the catalyst monitoring system 44 may enable the adjustment or calibration of gain rates used, for example, to control the engine 12, such as gain rates suitable for adjusting the control of the engine 12 to minimize or eliminate overcompensation or under compensation that may occur if the length L, volume V, and/or transport time T remain unknown.

For example, after an adjustment to engine 12 (e.g., adjustment to fuel flow, air flow, throttle input, and so on), differences between the first data set based on the first sensor 30 measurement and the second data set based on the second sensor 30 may be used, such as differences in oxygen measurements, may be used to derive the transport time T (e.g., time for gases to flow between the first sensor 30 and the second sensor 30). An adjustment to fuel flow may be a change in fuel mass or fuel volume via a gaseous or liquid fuel carburetor, gaseous or liquid fuel flow valve, gaseous or liquid fuel injector, or gaseous or liquid fuel pump. The adjustment to fuel flow may be a change in fuel mass or fuel volume via an indirect or direct injector in a diesel engine or an otto cycle engine. The adjustment to fuel flow may be a change in fuel entrainment timing into the engine, or any other fuel adjustment into an engine. An adjustment to air flow may be an adjustment to a throttle, or to intake or exhaust valve timing, or to an exhaust gas recirculation valve [EGR valve], or to a turbocharger wastegate valve or turbocharger blow-by valve or to any other air flow adjustment into an engine. The adjustment to engine 12 may also be a spark-timing adjustment or compression ratio adjustment or any other engine adjustment that affects engine exhaust gas constituents or temperatures. Based on the transport time T, engine power 12 currently produced, and/or current engine 12 efficiency; the volume or mass flow may be estimated. For example, $\dot{m}$ air+$\dot{m}$ fuel=$\dot{m}$ flow may be used in the derivation. In one embodiment, $\dot{m}$ flow may be derived by using the time T, and the by deriving $\dot{m}$ air and $\dot{m}$ fuel based on the sensor(s) 30. For example, when using a single sensor 30, e.g., the second sensor 30 disposed in the catalytic converter system inlet, a first measurement may be taken by the sensor 30, and then the engine 12 may be adjusted (e.g., increasing or decreasing fuel and/or air), and second measurement may then be taken. Differences between the first and second measurement may then provide for $\dot{m}$ air and/or $\dot{m}$ fuel. Likewise, when using two sensors 30, e.g., first sensor 30 in the engine 12 outlet and second sensor 30 in the catalytic converter system's inlet, measurement differences between the first and second sensor may provide for $\dot{m}$ air and/or $\dot{m}$ fuel. By using $\dot{m}$ flow and/or temperature measurements, estimated volume flow rate, exhaust 34 length L, and/or volume V may be derived. In addition or alternative to the oxygen measurements, NOx, carbon monoxide, carbon dioxide, and/or ammonia may be used, as well as measured temperatures, pressures, and flow rates, to derive the transport time T, volume V, and/or length L.

The catalyst monitoring system 44 may then provide adjustments suitable, for example, for maintaining a desired AFR setpoint. For example, control gains may be adjusted or calibrated to minimize or eliminate overcompensation or under compensation of engine 12 controls. The AFR setpoint may then be used by the engine control system 16 to provide for control of various actuators, including fuel delivery actuators, air delivery actuators, and so on. The catalyst monitoring system 44 can also be used to more accurately track catalyst oxygen storage over time in order to judge catalyst aging and effectiveness, for example, when the second and/or third sensor 30 are used. Without transport delay calibration, a control system may over judge or under judge catalyst aging. Accordingly, the techniques described herein provide for enhanced control of the engine system 10 even in custom installations of the exhaust conduit 34.

Figure 5:
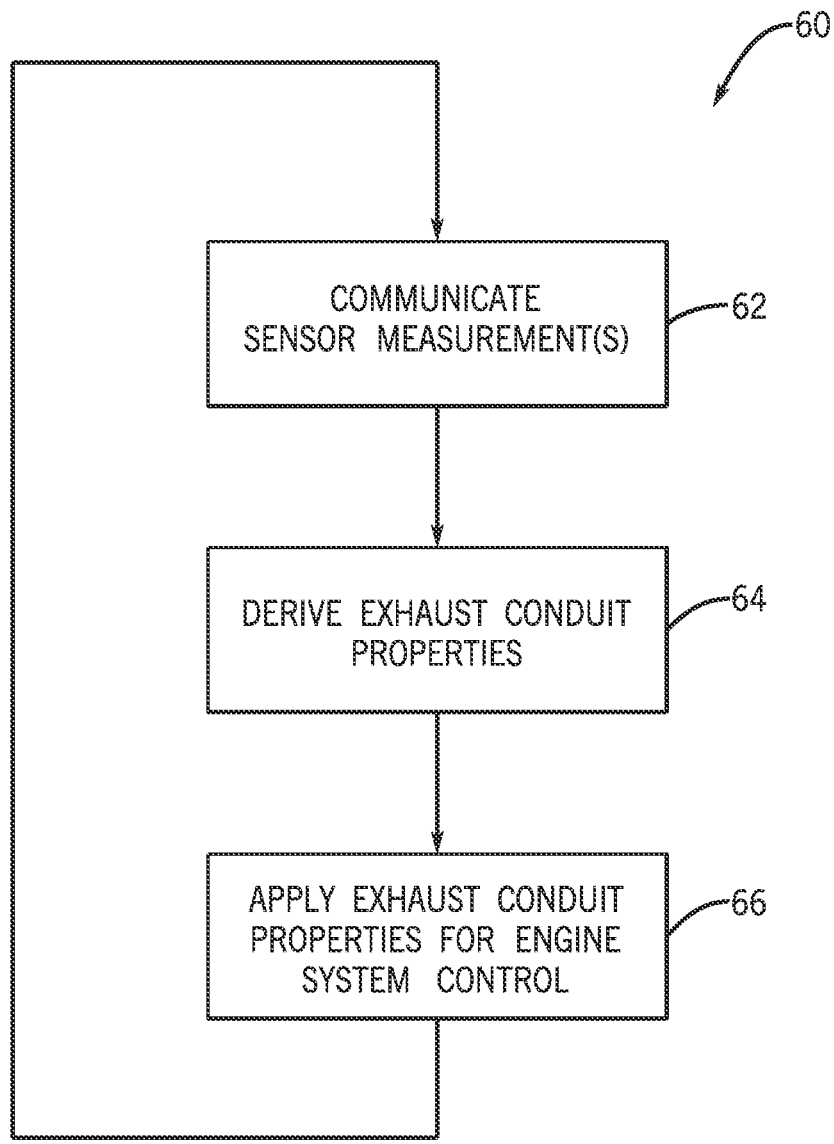
FIG. 5 is a flow chart depicting a process suitable for enhanced control of the engine system of FIG. 1, in accordance with an embodiment of the present approach.

FIG. 5 depicts an embodiment of a process of 60 suitable, for example, for enhanced control of the engine system 10 in custom installations of the exhaust conduit 34. Although the process 60 is described below in detail, the process 60 may include other steps not shown in FIG. 5. For example, the process 60 may include a first step of the engine control system 16 making an adjustment to the engine system 10. Additionally, the steps illustrated may be performed concurrently or in a different order. The process 60 may be implemented as computer code or instructions executable by the processors 18, 46 and stored in the memories 20, 48.

Beginning at block 62, the process 60 may communicate sensor 30 measurements, such as oxygen, NOx, carbon monoxide, carbon dioxide, ammonia, temperature, pressure, flow rates, and so on. The sensor 30 measurements may be communicated to the engine control system 16 and/or catalytic monitoring system 44. In some embodiments the signals may be transformed, for example via analog to digital converter (ADC) systems into data representative of physical observations at the one or more sensors 30.

The process 60 may then derive (block 64) one or more exhaust conduit 34 properties, such as length L, volume V, transport time T, temperatures, pressures, and/or mass flow rates. As described above, after an adjustment to engine 12 (e.g., adjustment to fuel, air, throttle input, and so on), differences between the first data set based on the first sensor 30 measurement and the second data set based on the second sensor 30 may be used, such as differences in oxygen measurements, may be used to derive the transport time T (e.g., time for gases to flow between the first sensor 30 and the second sensor 30). Based on the transport time T, engine power 12 currently produced, and/or current engine 12 efficiency, the volume or mass flow may be estimated. For example, ṁ air+ṁ fuel=ṁ flow may be used in the derivation. In addition or alternative to the oxygen measurements, NOx, carbon monoxide, carbon dioxide, and/or ammonia may be used, as well as measured temperatures, pressures, and flow rates, to derive the transport time T, volume V, and/or length L.

Additionally, the catalyst monitoring system 44 may estimate the oxygen storage dynamics 71 of the catalytic converter system 32. In particular, the catalyst monitoring system 44 may estimate the oxygen storage dynamics for the entire catalytic converter system 32, at various locations within the catalytic converter system 32, for subsets of cells within the catalytic converter system 32, and for each cell in the catalytic converter system 32.

At block 66, the process 60 may then apply the derivations of block 64 to control the engine system 10. In one example, a baseline calibration process may be performed, and the baseline calibration process may have assumed a certain length, volume, and/or transport delay for the exhaust conduit 34. The calibration process may result in a calibrated proportional integral derivate (PID) gain or other gain controller for the engine control system 16. Additionally or alternatively, the baseline calibration process may result in multiple PID gains stored, for example, in a lookup table; each PID gain may be calibrated for an assumed length, volume, and/or transport delay. The PID gains may be calibrated based on actual engine 12 tests and/or by using models of the engine 12 (e.g., Bode plots, root locus, or other frequency domain control design techniques). For embodiments where the baseline calibration is done purely based on engine 12 tests, a first order model may be derived from system 10 responses and used with derived transport delays to similarly obtain the lookup table having one or more PID gains for various lengths, volumes/and/or transport delays.

In one example, the process 60 may recalibrate or otherwise adjust control gain(s) to maintain a desired AFR with minimal (or no) overcompensation or under compensation. Generally, the gain rates may be decreased for longer transport delays, longer lengths L, and/or higher volumes V as compared to the baseline gain rate. Likewise, the gain rates may be increased for shorter transport delays, shorter lengths L, and/or lower volumes V as compared to the baseline gain rate. When the gain lookup tables are in use, the process 60 may "look up" a preferred gain rate based on derived transport times or delays, length L, and/or volume V. Accordingly, an adjusted gain rate may be derived, that may minimize or prevent overshoot or undershoot of, for example, PID embodiments of the control system 16. The process 60 may then iterate back to block 62. Accordingly, the engine system 10 may be more efficiently and accurately operated.

Technical effects include deriving a previously unknown length L, volume V, transport time T, temperatures, pressures, and/or mass flow rates for an exhaust conduit, such as a custom installed exhaust conduit. The techniques described herein further improve engine control by applying adjustments, such as a gain adjustments, based on the derivations of length L, volume V, transport time T, temperatures, pressures, and/or mass flow rates, to minimize or eliminate overcompensation and under compensation of control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system, comprising:
a controller comprising a processor configured to:
receive a first signal from a first sensor indicative of a first exhaust measurement, wherein the first sensor is disposed at an inlet of a catalytic converter system;
derive one or more of an estimated length, estimated volume, or estimated transport delay of an exhaust conduit based on the first signal, wherein a first end of the exhaust conduit is connected to an outlet of an engine, and a second end of the exhaust conduit is connected to the catalytic converter system inlet;
apply the one or more of estimated length, estimated volume, or estimated transport delay of the exhaust conduit to control a fuel flow, an airflow, or a combination thereof, of the engine; and
adjust a baseline gain rate to derive an adjusted gain rate by decreasing the baseline gain rate if the one or more of estimated length, estimated volume, or estimated transport delay is greater than a baseline length, a baseline volume, or a baseline transport delay; by increasing the baseline gain rate if the one or more of estimated length, estimated volume, or estimated transport delay is smaller than the baseline length, the baseline volume, or the baseline transport delay; or a combination thereof, and wherein the adjusted gain rate is applied to control the fuel flow, the airflow, or the combination thereof, of the engine.

2. The system of claim 1, wherein the processor is configured to derive the one or more of estimated length, estimated volume, or estimated transport delay of the exhaust conduit based on the first signal by deriving a time delay between an adjustment to the engine and an exhaust stream encountering the first sensor.

3. The system of claim 2, wherein the adjustment to the engine comprises a fuel flow adjustment, an air flow adjustment, or a combination thereof.

4. The system of claim 1, wherein the processor is configured to receive a second signal from a second sensor indicative of a second exhaust measurement, wherein the second sensor is disposed at the engine outlet, and wherein the processor is configured to derive the one or more of estimated length, estimated volume, or estimated transport delay of the exhaust conduit based on the first signal, the first signal and the second signal, or a combination thereof.

5. The system of claim 4, wherein the processor is configured to derive the one or more of estimated length, estimated volume, or estimated transport delay of the exhaust conduit based on the first signal and the second signal by deriving a time delay between the first signal and the second signal as an exhaust stream traverses between the first sensor and the second sensor.

6. The system of claim 1, wherein the processor is configured to:
receive a second signal from a second sensor indicative of a second exhaust measurement, wherein the second sensor is disposed at a catalytic converter system outlet of the catalytic converter system;
derive an oxygen storage estimate for the catalytic converter system based on the first signal and the second signal; and
apply the oxygen storage estimate to control the fuel flow, the airflow, or the combination thereof, of the engine.

7. The system of claim 1, wherein the first sensor comprises an oxygen sensor.

8. The system of claim 1, wherein the first sensor comprises a carbon monoxide sensor, a carbon dioxide sensor, an ammonia sensor, a temperature sensor, or a combination thereof.

9. A method for controlling an engine, comprising:
receiving, via a processor, a first signal from a first sensor indicative of a first exhaust measurement, wherein the first sensor is disposed at an inlet of a catalytic converter system;
deriving, via the processor, one or more of an estimated length, estimated volume, or estimated transport delay for an exhaust conduit based on the first signal, wherein a first end of the exhaust conduit is connected to an engine outlet of the engine and a second end of the exhaust conduit is connected to the catalytic converter system inlet;
applying, via the processor, the one or more of estimated length, estimated volume, or estimated transport delay to control a fuel flow, an airflow, or a combination thereof, of the engine; and
adjusting, via the processor, a baseline gain rate to derive an adjusted gain rate by decreasing the baseline gain rate if the one or more of estimated length, estimated volume, or estimated transport delay is greater than a baseline length, a baseline volume, or a baseline transport delay; by increasing the baseline gain rate if the one or more of estimated length, estimated volume, or estimated transport delay is smaller than the baseline length, the baseline volume, or the baseline transport delay; or a combination thereof, and wherein the adjusted gain rate is applied to control the fuel flow, the airflow, or the combination thereof, of the engine.

10. The method of claim 9, wherein the processor is configured to derive the one or more of estimated length, estimated volume, or estimated transport delay of the exhaust conduit based on the first signal by deriving a time delay between an adjustment to the engine and an exhaust stream encountering the first sensor.

11. The method of claim 10, wherein the processor is configured to receive a second signal from a second sensor indicative of a second exhaust measurement, wherein the second sensor is disposed at the engine outlet, and wherein the processor is configured to derive the one or more of estimated length, estimated volume, or estimated transport delay of the exhaust conduit based on the first signal, the first and the second signal, or a combination thereof.

12. The method of claim 11, comprising:
receiving a third signal from a third sensor indicative of a third exhaust measurement, wherein the third sensor is disposed at a catalytic converter system outlet of the catalytic converter system;
deriving an oxygen storage estimate for the catalytic converter system based on the first signal and the third signal; and
applying the oxygen storage estimate to control the fuel flow, the airflow, or the combination thereof, of the engine.

13. A tangible, non-transitory computer-readable medium comprising executable instructions, that when executed by a processor, cause the processor to:
receive a first signal from a first sensor indicative of a first exhaust measurement, wherein the first sensor is disposed at a catalytic converter system inlet of a catalytic converter system;
derive one or more of an estimated length, estimated volume, or estimated transport delay of an exhaust conduit based on the first signal, wherein a first end of the exhaust conduit is connected to an outlet of an engine, and a second end of the exhaust conduit is connected to the catalytic converter system inlet;
apply the one or more of estimated length, estimated volume, or estimated transport delay of the exhaust conduit to control a fuel flow, an airflow, or a combination thereof, of the engine; and
adjust the fuel flow, the air flow, or the combination thereof, based on an adjusted gain rate, wherein the adjusted gain rate is derived by decreasing a baseline gain rate if the one or more of estimated length, estimated volume, or estimated transport delay is greater than a baseline length, a baseline volume, or a baseline transport delay; by increasing the baseline gain rate if the one or more of estimated length, estimated volume, or estimated transport delay is smaller than the baseline length, the baseline volume, or the baseline transport delay; or a combination thereof.

14. The tangible non-transitory computer-readable medium of claim 13, wherein the instructions are configured to cause the processor to derive the one or more of estimated length, estimated volume, or estimated transport delay of the exhaust conduit based on the first signal by deriving a time delay between an adjustment to the engine and an exhaust stream encountering the first sensor.

15. The tangible non-transitory computer-readable medium of claim 13, wherein the instructions are configured to receive a second signal from a second sensor indicative of a second exhaust measurement, wherein the second sensor is disposed at the engine outlet, and wherein the instructions are configured to derive the one or more of estimated length, estimated volume, or estimated transport delay of the exhaust conduit based on the first signal, the first signal and the second signal, or a combination thereof.

16. The tangible non-transitory computer-readable medium of claim 15, wherein the instructions configured to derive the one or more of estimated length, estimated volume, or estimated transport delay of the exhaust conduit based on the first signal and the second signal comprise instructions configured to derive a time delay between the first signal and the second signal as an exhaust stream traverses between the first sensor and the second sensor.

17. The tangible non-transitory computer-readable medium of claim 13, wherein the instructions are configured to cause the processor to:
    receive a second signal from a second sensor indicative of a second exhaust measurement, wherein the second sensor is disposed at a catalytic converter system outlet of the catalytic converter system;
    derive an oxygen storage estimate for the catalytic converter system based on the first signal and the second signal; and
    apply the oxygen storage estimate to control the fuel flow, the airflow, or the combination thereof, of the engine.

* * * * *